Sept. 11, 1962 F. K. GEIGER 3,053,567
MOTOR CAR HAVING A FOLDING TOP COMPARTMENT
AND A COVER THEREFOR
Filed Aug. 19, 1957 5 Sheets-Sheet 1
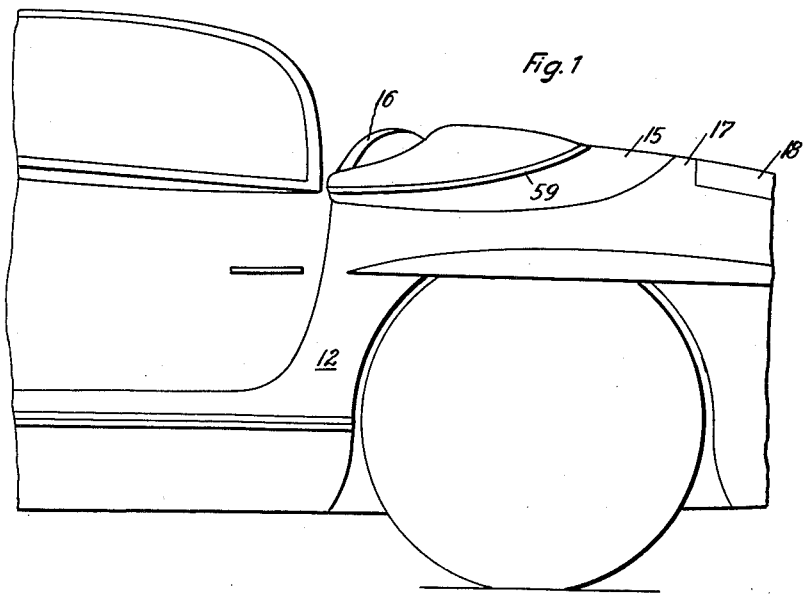
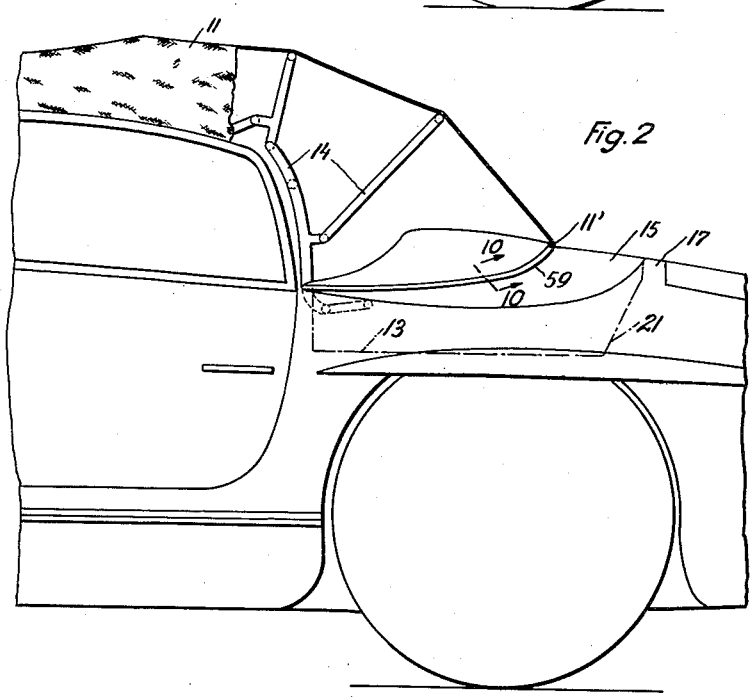
Inventor
FRIEDRICH K. GEIGER
BY Dicke and Craig
ATTORNEYS.

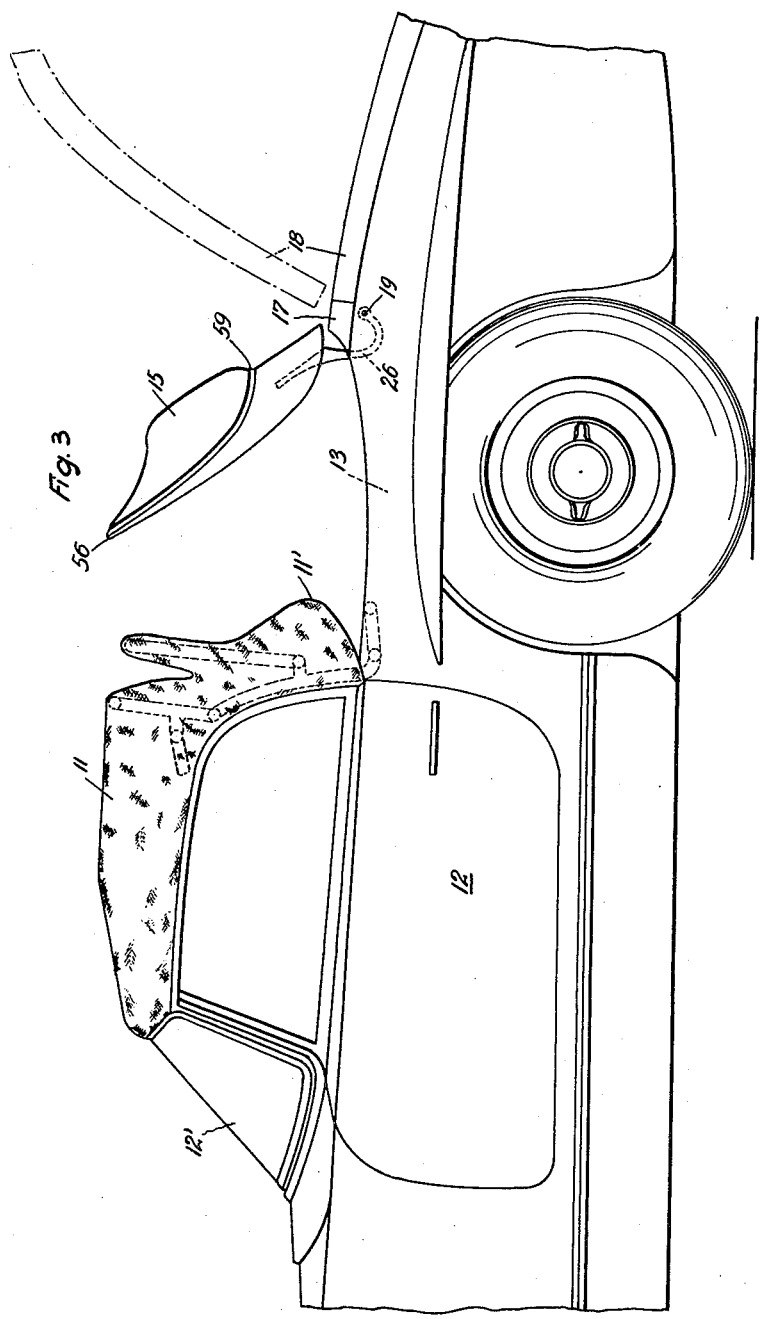

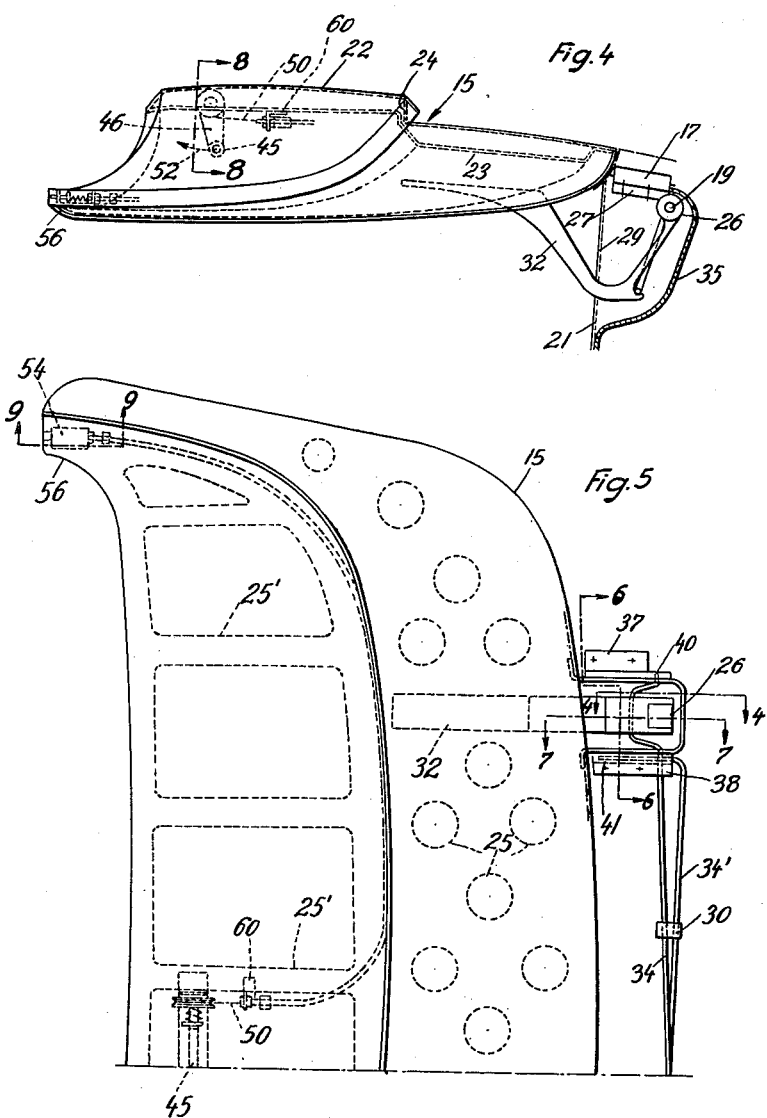

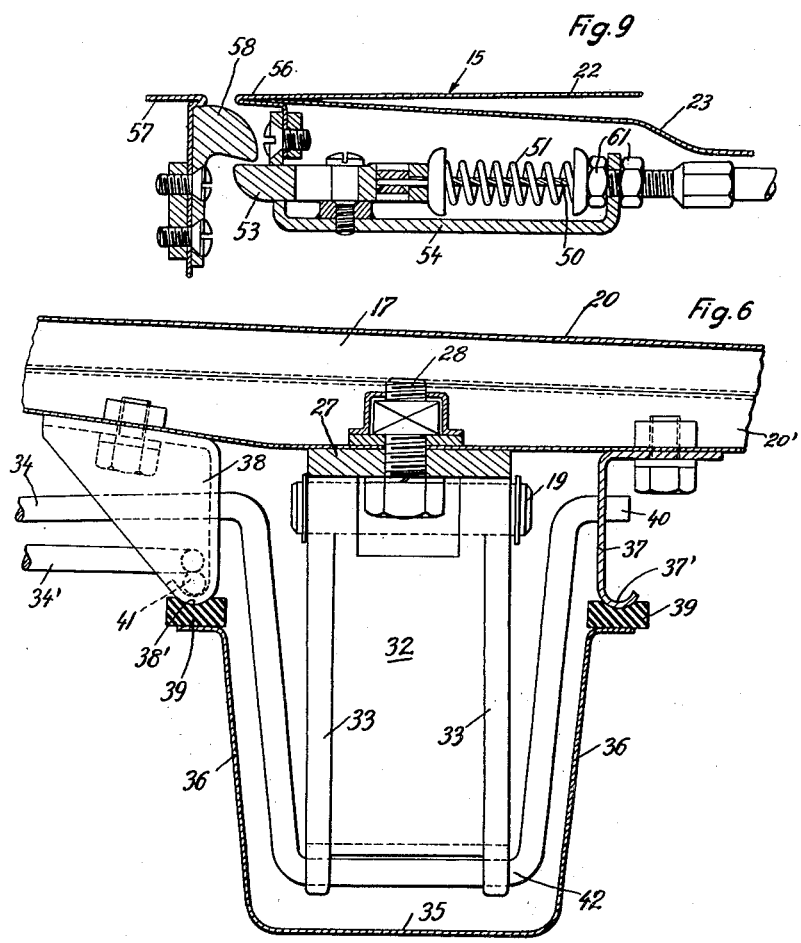

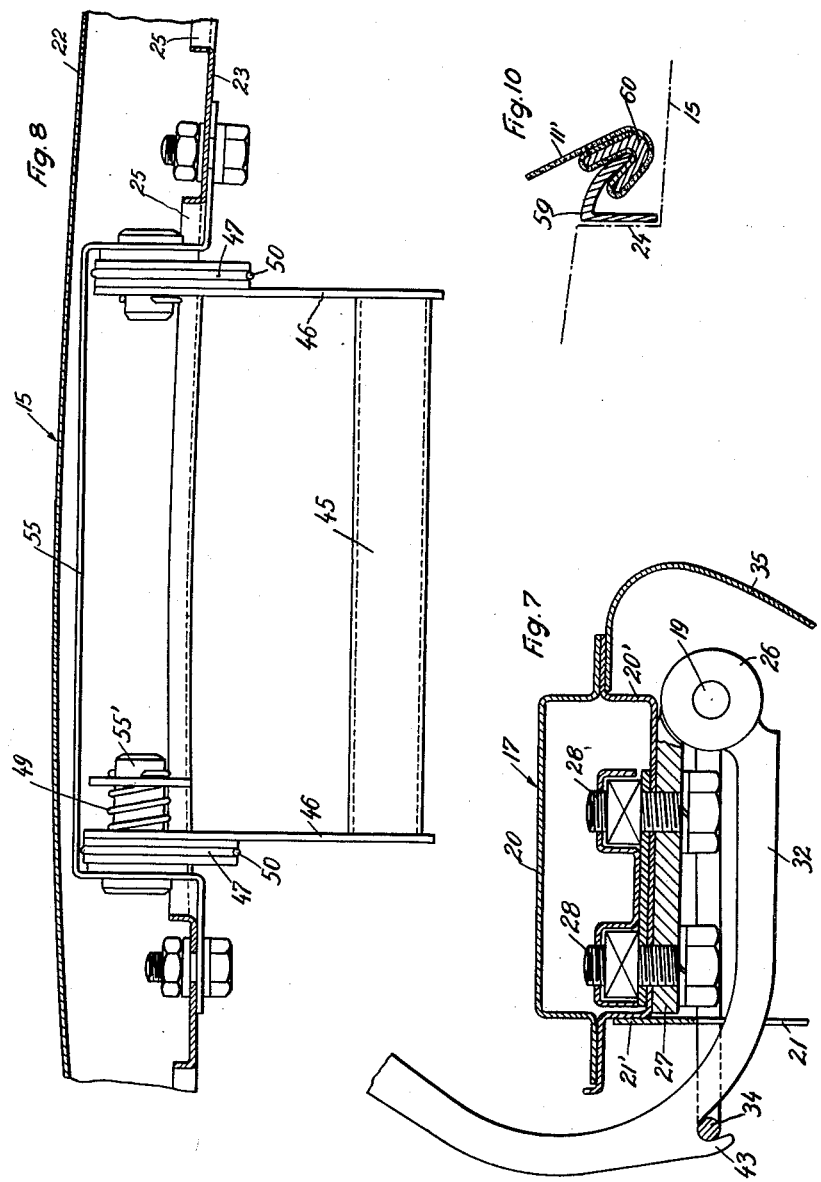

United States Patent Office 3,053,567
Patented Sept. 11, 1962

3,053,567
MOTOR CAR HAVING A FOLDING TOP COMPARTMENT AND A COVER THEREFOR
Friedrich K. Geiger, Boeblingen, Germany, assignor to Daimler-Benz Aktiengesellschaft, Stuttgart-Unterturkheim, Germany
Filed Aug. 19, 1957, Ser. No. 678,953
Claims priority, application Germany Aug. 18, 1956
5 Claims. (Cl. 296—107)

My invention relates to a motor car having a compartment for a folding top and a cover for such compartment.

It is the object of my invention to facilitate the manufacture and the assembly of the cover and to provide improved means facilitating the opening thereof. Another object of my invention is a provision of a folding top, a compartment and a cover therefor which are simple, inexpensive, of light weight, and of a rugged structure which may be easily operated and has a long life.

Further objects of my invention will appear from the description following hereinafter of a preferred embodiment thereof with reference to the accompanying drawings. It is to be understood, however, that my invention is in no way limited to the details of such embodiment but is capable of numerous modifications within the scope of the appended claims and that the terms and phrases used in such detailed description have been chosen for the purpose of illustrating the invention rather than that of restricting or limiting same.

In the drawings:

FIG. 1 is a partial side view of the middle section of a motor car having a folding top disposed in a special compartment closed by a cover, such car embodying my invention, FIG. 2 is a side view similar to that of FIG. 1 of the motor car with its top in unfolded condition, the cover of the top compartment being closed, FIG. 3 is a side view similar to that of FIG. 2, the cover of the top compartment being shown in opened condition and the top being partly collapsed preparatory to its dismantling and folding down into the compartment, FIG. 4 is a side view of the cover in closed condition, the rear wall of the top compartment and a body carrying same being shown in section, FIG. 5 is a plan view of the elements shown in FIG. 4, those parts located on one side of the vertical central longitudinal plane of the car being illustrated only and the body beam being omitted, FIG. 6 is a section taken along the line 6—6 of FIG. 5 on an enlarged scale illustrating one of the two cover hinges and the associated torsional springs, FIG. 7 is a section taken along the line 7—7 of FIG. 5, same being a vertical section taken through one of the hinges of the cover, FIG. 8 is the partial section taken along the line 8—8 of FIG. 4 illustrating a handle for opening the lock of the cover, FIG. 9 is the vertical section taken along the line 9—9 of FIG. 5 illustrating one of the cover locks, and FIG. 10 is the section taken along the line 10—10 of FIG. 2 showing means for attaching the rear edge of the folding top to a shoulder provided in the cover of the top compartment.

As shown in FIGS. 1, 2 and 3 the motor car is provided with a folding top 11 which if folded together is accommodated together with its struts 14 within a compartment 13 which is provided in the body 12 of the car behind the back of the rear seat 16. A cover 15 formed by a rigid sheet metal structure is hingedly mounted at its rear end by a pair of co-axially disposed hinges on the body 12 for completely closing the compartment 13. In its closed condition the cover lies flush with the top face of the body 12. The hinge means carrying the cover 15 are supported by and mounted on a hollow transverse beam 17 of the body which is so curved as to conform to the curved top surface of the body, FIG. 8, and is preferably formed by a hollow box-shaped sheet metal structure composed of channel parts 20 and 20′ having superimposed flange portions rigidly connected, preferably welded, to each other. The conventional cover 18 of the baggage compartment may be hinged to the hollow transverse beam 17.

Each of the pair of spaced co-axial hinges 26 provided for hingedly mounting the rear end of the cover 15 on the body 12 is composed of a movable part in form of a curved arm 32 fixed to the cover 15, of a fixed part 27 attached by threaded bolts 28 to the bottom of the hollow beam 17, and of a pin 19 pivotally connecting the parts 32 and 27 of the hinge and extending through suitable eyes thereof. The rear wall 21 of the top compartment depends from the vertical front wall of the channel member 20′ of the beam 17 being suitably welded thereto and is provided with a pair of apertures 29, FIG. 4. Each arm 32 is so curved that, when the cover is in closed condition, the arm extends from the hinge 26 downwardly towards the wall 21, through the aperture thereof and, inside of the wall 21, upwardly into contact with the cover to which the arm 32 is suitably connected, for instance by welding. The aperture 29 is large enough to permit the arm to swing into the position illustrated in FIG. 7, when the cover 15 is fully opened.

The cover 15 comprises a pair of superimposed substantially crescent-shaped convex sheet metal shells 22, 23, FIG. 4, each shell being formed with a curved rearwardly facing shoulder 24 extending to the lateral forward ends of the crescent-shaped shells. These shells are spaced from each other except for their edges and for their shoulders 24 where the shells 22, 23 are fixed to each other, for instance by welding. For the purpose of the reduction of the weight of the cover, the lower shell 23 may be provided with apertures 25 and 25′. Upper shell 22 has substantially arcuate front and rear essentially horizontal upper faces that are vertically offset from each other by shoulder 24 of shell 22.

Sheet metal hoods 35 disposed behind the rear wall 21 of the top compartment and covering the apertures 29 thereof are suitably secured to the rear wall 21. Each arm 32 may be formed by a wide sheet metal strip reinforced at its bottom by lateral flanges 33, FIG. 6.

Preferably, spring means are co-ordinated to the body 12 and to the cover 15 tending to open the latter. In the embodiment shown such spring means comprises a pair of torsional rods 34 and 34′ extending between the hinges 26, each rod having one end, such as 41, fixed to the body and having its other end, such as 40, 42 fixed to the movable part 32, 33 of the hinge 26. For the purpose of fixing the end 41 of the rod 34, or 34′ respectively to the body, a depending bracket 38 is mounted to the bottom of the hollow transverse body beam 17, FIGS. 5 and 6, having a vertical wall extending longitudinally of the vehicle and substantially in alignment with a side wall 36 of the sheet metal hood 35. This vertical wall of the bracket 38 has a curved flange 38′ engaging a strip 39 of resilient material, such as rubber, fixed to a horizontal flange of the side wall 36. The end section 41 of each of the torsional spring bars 34, 34′ is bent to extend substantially forwardly, FIG. 5, and is seated on the inside of the flange 38′ of the bracket 38. Both of the torsional spring bars 34 and 34′ extend through a pair of straps 30 fixed to the bottom of the transverse body beam 17 and the other end section of each spring bar is bent to form a loop 42 extending beneath the arm 32, FIG. 7, and seated in hook-shaped projections 43 of the flanges 33 thereof. The end 40 of each spring bar is journalled in a bore of a second bracket 37 bolted to the bottom of the transverse body beam 17 and having a bottom flange 37' engaging the rubber strip 39 mounted on the flange of the hood 35 co-extensive therewith. The torsional spring bars 34 and 34' are so biased when assembled as to have the tendency of swinging the cover 15 into the opened position illustrated in FIG. 3.

In its closed position the cover 15 is locked by locks 54 mounted on the lateral forward portions 56 of the cover 15 and co-operating with keepers 58 mounted on the rear door posts 57 of the body 12. When the cover 15 is swung down into closed position, a latch member 53 slidably guided in each lock 54 in the horizontal fore-and-aft direction and having a head provided with a rounded bottom face will engage the rounded top side of the keeper 58 and will be moved by the latter rearwardly contrary to the force of a spring 51 which will cause the latch 53 to snap into position beneath the keeper 58, when the cover 15 is completely closed, whereby the cover will be locked with the door post 57 provided on each side of the vehicle, FIG. 9.

For the purpose of opening the cover 15 a substantially U-shaped handle composed of a transverse horizontal bar 45 and upwardly extending parallel sheet metal arms 46 fixed to the ends thereof is pivotally mounted by nonrotatable pivot pins 55' to a bracket 55 attached by threaded bolts to the lower shell 23 of the cover 15. A helical spring 49 surrounds each pin 55' and has one end anchored to the arm 46 and the other end anchored to the pin 55'. The springs 49 tend to rock the handle 45 in the direction of the arrow 52, FIG. 4. A sheave 47 is fixed to each arm 46. The core chord 50 of a flexible push-pull cable seated in the groove of the sheave 47 has one end fixed to the bottom portion thereof and has its other end fixed to the latch 53, FIGS. 4 and 9. The sheave of this push-pull cable has one end mounted to a bracket 60, FIG. 5, fixed to the cover shell 23, while its other end is fixed by nuts 61 to the housing of the lock 54. Each cable extends from the associated sheave 47 on the bottom of the cover along an arcuate path adjacent to the rear edge of the cover to the lock 54.

When the driver wishes to open the cover 15 he must fold the back 16 of the seat forwardly and must grasp the handle 45 pulling it in the direction of the arrow 52. As a result, a pull will be exerted upon the push-pull cables 50 which will draw the latches 53 of both locks 54 rearwardly out of engagement with the keepers 58. Upon such disengagement of the latches 53 the cover 15 will be swung upwardly by the torsional spring rods 34 and 34' automatically into its upper opened position, FIG. 3, whereupon the driver may either take the top 11 out of the compartment for the purpose of unfolding it or he may fold the top and stow it away in the compartment 13.

When the top has been unfolded, it will be loosely connected to the wind screen 12' whereupon the cover 15 will be closed. Then the rear edge 11' of the canvas of the cover will be pulled down into the proximity of the shoulder 24 of the cover 15, FIGS. 2, 3 and 10. An angle bar 59 is fixed to the cover extending along the shoulder 24 thereof and having a free arm extending at an acute angle rearwardly and downwardly. The rear edge 11' of the folding top is provided with a similar angle bar 60 having a free arm extending forwardly and upwardly. By means of this bar 60 the edge of the canvas top will be engaged in the angle bar 59 of the closed cover 15, whereupon the canvas will be pulled taut by the final attachment of the folding top to the wind screen 12' by means of the conventional straps.

While the invention has been described in connection with a preferred embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains, and as fall within the scope of the invention or the limits of the appended claims.

What I claim is:

1. A motor car body having a compartment for a folding top and a transverse hollow beam carrying the rear wall of said compartment, said rear wall being provided with apertures, a pivotal cover for said compartment, a pair of coaxial hinges for said cover, each hinge being composed of a part fixed to said beam behind said rear wall, of an arm extending from said part forwardly through one of said apertures to said cover and being fixed thereto and of a pin pivotally connecting said part to said arm, hoods mounted on the back of said rear wall and covering said apertures and surrounding said hinges, two pairs of brackets each pair being associated with one of said hinges and comprising a first bracket mounted on the outside of and a second bracket mounted on the inside of said one of said hinges adjacent thereto, a pair of torsional spring rods each coordinated to one of said hinges and journaled in said pair of brackets associated therewith and extending therefrom into engagement with and secured to said second bracket associated with the other one of said hinges, said spring rod being formed with a loop engaging said arm of the associated hinge and being disposed between said brackets associated therewith, each of said spring rods being so biassed as to tend to swing said one of said arms in cover-opening direction, and sealing strips inserted between said brackets and said hoods.

2. In a motor car body having a compartment for accommodating a folding top in folded condition, an improved cover pivotally mounted to cover said compartment, said cover having vertically offset essentially horizontal front and rear upper portions interconnected to each other by a rearwardly facing essentially upright shoulder, said shoulder extending generally transversely of said body over substantially the entire width of said cover, and means for detachably sealing said folding top to said shoulder when said top is in the raised, unfolded position.

3. A motor car body as defined in claim 2, further comprising a transverse hollow beam carrying a rear wall of said compartment accommodating said folding top, hinge parts behind said rear wall and attached to said beam for the pivotal attachment of a cover, said rear wall having apertures dimensioned to afford passage therethrough to hinge arms extending forwardly through said apertures and being fixed to said cover, and hoods disposed behind said rear wall and covering said apertures and said hinge parts.

4. In a motor car body having a compartment for accommodating a folding top in the lowered position thereof, an improved pivotal cover for said compartment comprising a pair of superimposed integrally connected substantially crescent-shaped sheet-metal shells, each shell being formed with vertically offset essentially horizontal front and rear portions interconnected by a curved rearwardly facing substantially upright shoulder extending over substantially the entire width of said cover, said shells contacting each other at the forward and rear edges thereof and at said shoulder, and means for detachably connecting said folding top in the raised position thereof to the upper of said superimposed shells at the curved rearwardly facing essentially upright shoulder.

5. A motor car body provided with a compartment behind the passenger space of the car, a folding top accommodated within said compartment in the lowered position thereof, a pivotal cover for said compartment, said cover comprising front and rear upper face portions spaced from each other by shoulder means extending substantially the entire width of said cover, pivot means for said cover, and means for sealing said top to said shoulder means in the raised position of said top, said last-mentioned means including a first member secured to said shoulder means and having arm means extending downwardly and rearwardly therefrom, said arm means being above said rear upper face portion, and a second member connected to said top adjacent the lower peripheral edge thereof having arm means inclined upwardly and forwardly to engage said arm means of said first member.

References Cited in the file of this patent

UNITED STATES PATENTS

| | | |
|---|---|---|
| 1,996,595 | Smith | Apr. 2, 1935 |
| 2,599,277 | Orr | June 3, 1952 |
| 2,747,928 | Olivier | May 29, 1956 |
| 2,800,361 | Kubacka | July 23, 1957 |
| 2,845,299 | Pickering | July 29, 1958 |

FOREIGN PATENTS

| | | |
|---|---|---|
| 656,061 | France | Apr. 26, 1929 |
| 356,029 | Germany | July 11, 1922 |